United States Patent
Cheeseman

(10) Patent No.: US 6,376,122 B1
(45) Date of Patent: Apr. 23, 2002

(54) TUBULAR BATTERY HOUSING WITH UNIFORMLY THIN WALLS

(75) Inventor: Paul G. Cheeseman, Newtown, CT (US)

(73) Assignee: The Gillette Company, Boston, MA (US)

( * ) Notice: Subject to any disclaimer, the term of this patent is extended or adjusted under 35 U.S.C. 154(b) by 1342 days.

(21) Appl. No.: 08/744,894

(22) Filed: Nov. 8, 1996

Related U.S. Application Data

(63) Continuation of application No. 08/537,172, filed on Sep. 29, 1995, now abandoned, which is a continuation of application No. 08/229,974, filed on Apr. 19, 1994, now abandoned.

(51) Int. Cl.⁷ ................................................. H01M 2/02
(52) U.S. Cl. ........................................... 429/99; 429/100
(58) Field of Search .............................. 429/96, 97, 98, 429/99, 100, 159, 163, 164, 170; 29/623.1, 623.2, 623.4, 623.5

(56) References Cited

U.S. PATENT DOCUMENTS

| 4,460,663 A | * | 7/1984 | Stutzbach | 429/151 |
| 4,587,183 A | * | 5/1986 | McCantney, Jr. | 429/176 |
| 4,997,731 A | * | 3/1991 | Machida et al. | 429/90 |

* cited by examiner

*Primary Examiner*—Carol Chaney
(74) *Attorney, Agent, or Firm*—Barry D. Josephs

(57) ABSTRACT

A novel battery assembly which includes an electrochemical cell positioned within an extruded, tubular housing; and, a method for making such a battery assembly.

10 Claims, 2 Drawing Sheets

TUBULAR BATTERY HOUSING WITH UNIFORMLY THIN WALLS

This application is a continuation, of application Ser. No. 08/537,172, filed Sep. 29, 1995, now abandoned.

This application is a continuation of application Ser. No. 08/229,974, filed Apr. 19, 1994, now abandoned.

INTRODUCTION

This invention relates generally to batteries, and more particularly to batteries comprising an assembly of electrochemical cells in a novel housing.

BACKGROUND OF THE INVENTION

Assemblies of electrochemical cells interconnected in series and positioned in containers are known to the art. Such battery assemblies can be used as an energy source in a variety of applications, for example personal computers, cellular telephones, video camcorders, and the like. The batteries may use primary (i.e. non-rechargeable) such as alkaline cells, or secondary (i.e. rechargeable) such as nickel/metal hydride cells.

Batteries for computers, cellular phones and other applications are presently packaged in many ways. Generally, they are placed within an injection molded, two piece, plastic container, or in a shrink wrapped plastic tube that encases the battery cells. These packaging means present some notable shortcomings. For example, injection molded plastic housings generally must be formed with rather thick walls. Typically, a minimum housing wall thickness of about 0.7 millimeters is encountered.

Electrochemical cells contain chemically active substances which react with each other to generate electricity. For any given application, it is desirable to use cells having the largest possible size, whereby to enable the greatest amount of derivable energy to be available. Accordingly, for many applications, standard housing walls can not be employed because the size of an encased assembly of electrochemical cells of sufficient size to provide the required energy would be too large to fit within the space of the electrical device for which it is intended.

Conventional housings, such as injection molded housings, can present significant costs of manufacture, particularly for fabricating housings having comparatively thin walls. In the case of shrink wrapping, a thin wall battery housing can be provided at a relatively low cost. However, a shrink wrap battery assembly will often have bulbous protrusions, wrinkling, or other undesired features which can interfere with the intended use of the encased assembly, and which may necessitate burdensome and costly repackaging of the cell assembly. For example, bulbous protrusions and other undesired topography can result in the shrink wrap cell assembly having a non-uniform thickness that renders the assembly too large to fit within the allocated space of an electrical device. Shrink wrapped items, especially those with such features, are also aesthetically undesirable.

Further, as a consequence of the manner in which a shrink wrap housing is formed, the cell housing generally can only be of a shape that directly corresponds to the shape of the one or more encased battery cells. This effectively precludes use of shrink wrap cell housings for many applications. For example, it is often desirable or necessary to form a groove or other defined element on the outer surface of the housing. Such features are commonly used for orientation. Other surface features, not possible when a shrink wrap is used, may include devices for ensuring proper loading, for interlocking the cell assembly into the device, for displaying an element through a window in the electrical device, and the like.

It would, therefore, be desirable to have a battery housing that has relatively uniform and exceptionally thin walls. It would further be desirable to have such a battery housing wherein desired topography can be formed on the housing surface.

SUMMARY OF THE INVENTION

The present invention provides a novel battery assembly that includes a housing with walls having uniform and extremely small cross-sectional thickness (e.g., less than 0.7 millimeters) and which has a good visual appearance. In another aspect the invention provides a method for forming such battery assemblies and housings therefore.

The invention is based in part on the discovery that an extrusion molding process can produce a plastic battery cell housing, including a housing of a generally rectangular sleeve shape, which has a thin and uniform wall structure and an aesthetically pleasing exterior. Further, the use of such extrusion molding process enables cell housings to be manufactured at relatively low cost.

These and other features and objects of the invention will be readily understood from the following detailed description of the invention which should be read in light of the accompanying drawings.

DETAILED DESCRIPTION OF THE INVENTION

The invention provides an improved battery assembly characterized in part by a plastic housing produced by an extrusion process. The housing has small wall thicknesses, including thicknesses of less than about 0.7 millimeters.

Figure 1:
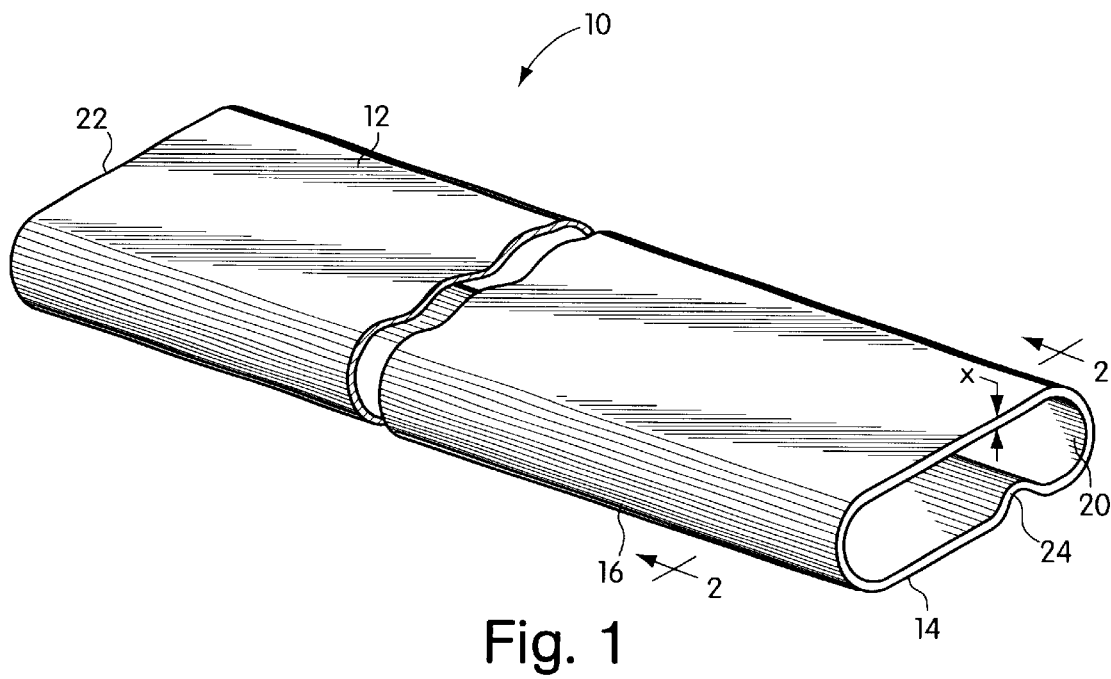
FIG. 1 is a perspective view of a battery housing of the invention.
Figure 2:
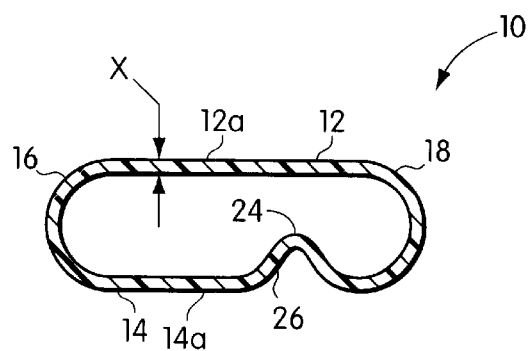
FIG. 2 is a section view taken along line 2—2 of FIG. 1.

Referring to the drawings, FIGS. 1–2 shows an extrusion molded plastic battery housing 10 made in accordance with the invention. The particular preferred embodiment, depicted in FIG. 1 sans ends, is a generally rectangular, sleeve-shaped housing 10 having a substantially flat top and bottom wall portions 12, 14 and curved side portions 16, 18 that together define oval-shaped front and rear open ends 20, 22. Housing 10 can include one or more ribs, such as arcuate indentation 24, which defines cavities into which a plurality of individual battery cells can be positioned as discussed more fully below.

Plastic housing 10 is formed by an extrusion process wherein melted resin is pumped through a die that forms the resin into the desired housing shape. After extrusion, the shaped resin will advantageously be passed through an air gap as it exits the die where the melt is drawn to an even thinner cross-section. The melt is then cooled to maintain the form thereof. In this way, it is possible to obtain an extended "endless" length of extruded material which, after cooling and hardening, can readily be cut transversely to desired lengths.

It will be evident that it is possible to cut lengths of housing for use with any number of cells. For example, for a 4.5 volt battery using 1.5 volt cells to be enclosed in a housing having the configuration shown in FIG. 1, where three cells can be positioned side by side, the extruded tube will be cut to a length slightly longer that the height of one battery, sufficient to hold the three cells together with appropriate end members. Should a 9 volt battery having the same configuration be desired, the extruded tube will be cut to a length slightly longer that the combined height of two batteries. In this way it becomes possible to make a variety of batteries using a single extrusion and identical end members.

Preferred resins for manufacture of the battery housings of the invention include polycarbonates such as is sold under the tradename LEXAN by General Electric, ABS (acrylonitrile-butadiene-styrene) resins and polyvinylchlorides. For aesthetic reasons it may be desired to color the resins prior to formation of the cell housing with suitable color concentrates. Additionally, if desired the formed cell housing may be imprinted with a logo or name of the product manufacturer or distributor or other information.

The extrusion process of this invention enables fabrication of a tubular, continuous cell housing 10 having a very thin and uniform wall, including portions 12, 14, 16 and 18. As used herein, the term "uniform wall", or other similar phrase, is intended to refer both to the thickness of the wall over its full extent and also that the surface of the cell housing wall is, at least to the naked eye, substantially devoid of undesired topography; e.g., an undesired protrusion or wrinkling of polymer material.

The uniform wall thickness of the particularly preferred battery cell housings of the invention provides a number of advantages. Among them are the ability to ensure that a preassembled battery assembly comprised of a plurality of cells and of predetermined dimensions will fit into the housing and that the housing will fit within an allocated space (cavity) of an electrical device. Specifically preferred cell housings of the invention have a range of thicknesses of about 0.2 millimeters or less or, preferably, about 0.1 millimeters or less across the entire housing. As a consequence of the uniform and smooth wall surface, the cell housings of the invention also have an aesthetically pleasing exterior.

The wall thickness of housing 10 is illustrated by the dimension "X" as depicted in FIGS. 1–2. It has specifically been found that an extrusion process enables fabrication of a cell housing 10 having a wall thickness of less than about 0.7 millimeters, and even wall thicknesses of less than about 0.6 or 0.5 millimeters. As indicated above, a structurally sound battery housing having such small dimensions can be highly advantageous in many applications; particularly where the space occupied by the cell assembly within an electrical device must be as small as possible, as with many personal computers and cellular telephones.

Added strength is provided by the presence of the cells themselves, especially where prismatic cells are used. This is particularly effective in view of the close fit that can be obtained using the technology described herein which permits close tolerances and smooth, highly uniform wall surfaces throughout.

It has additionally been found that by means of such an extrusion process cell housings 10 of a wide variety of shapes can be formed. For example, as depicted in FIGS. 1–2, cell housing 10 suitably can include a flute in one or more wall surfaces. Flute 26 is positioned to mate with a corresponding ridge in the battery cavity of an electrical device to thereby guide correct placement and entry of the cell assembly into, and/or interlocking of the assembly within, the device. A variety of other elements can be formed in the surface of the cell housing to guide proper entry of the cell housing within an electrical device. For example, the cell housing can include one or more raised surfaces or ridges that extend longitudinally along the exterior surface of wall 12 and that help guide the battery into an electrical device as well as to aid interlocking of the housing in the device.

Figure 3:
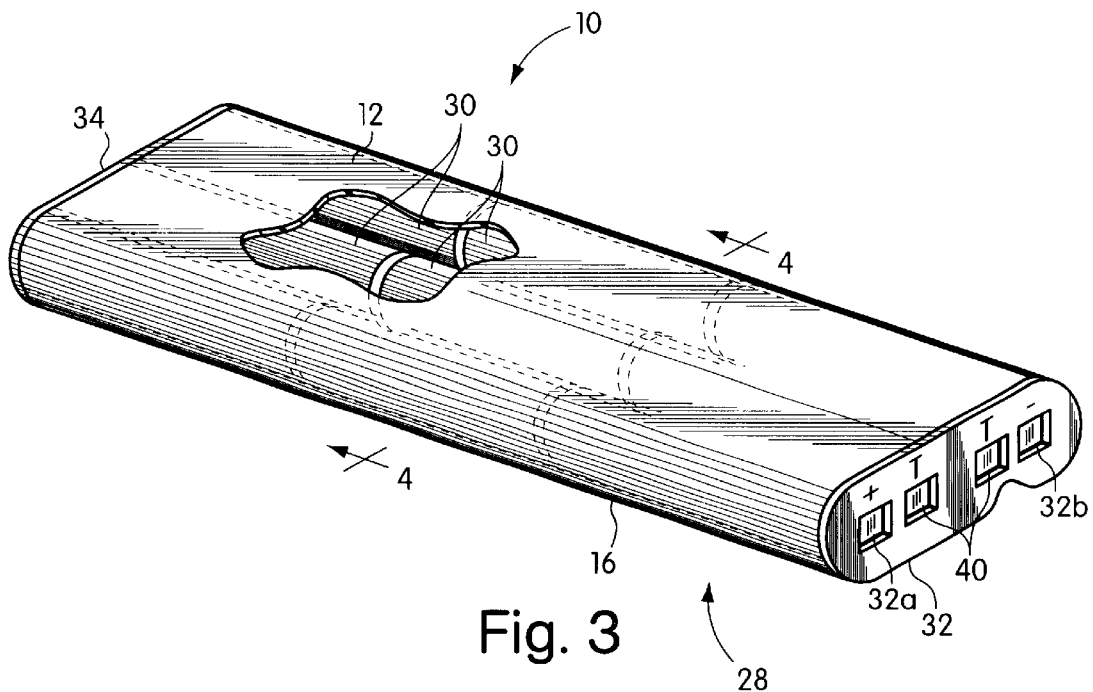
FIG. 3 is a partial cut-away perspective view of a battery assembly of the invention.
Figure 4:
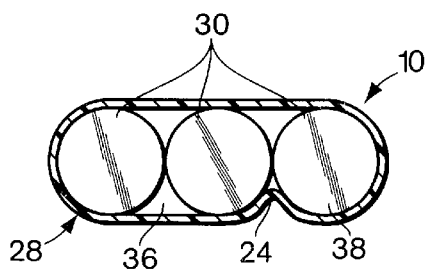
FIG. 4 is a section view taken along line 4—4 of FIG. 3.
Figure 5:
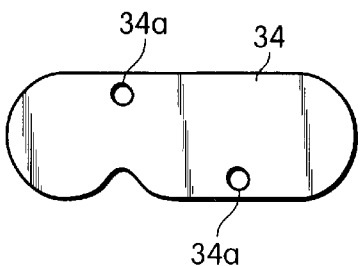
FIG. 5 is a view of the rear face of a battery housing of the invention.

FIGS. 3–5 show a preferred battery assembly, made in accordance with the invention, which includes an extrusion molded plastic housing 10 that encases a plurality of individual, cylindrical battery cells 30. The ends of housing 10 are enclosed with terminal plate 32 and end cap 34, respectively. The individual battery cells 30 can be positioned in a variety of configurations depending upon the shape of housing 10. In the embodiment shown, there are nine cells electrically connected together in series.

As shown in FIGS. 3 and 4, each of the electrochemical cells 30 used in the particular exemplary embodiment of the invention depicted herein has a substantially cylindrical shape. The cells are connected in electrical series by stacking three cells in an in-line arrangement to form rows extending along the long dimension of the housing with the flat end surfaces of the cells of a particular row adjacent each other. Although the particular embodiment depicted in FIG. 3 shows three rows of three cells each, the cell housing can be shaped to accommodate essentially any number of individual battery cells. Similarly, other configurations of the cells 30 also will be suitable. For example, individual battery cells could extend across the width of a housing devoid of any flute rather than along the length thereof. Other suitable battery arrangements will be known to those skilled in the art.

Cells 30 are preferably secondary cells, i.e. rechargeable, such as nickel/metal hydride or lithium ion cells. Of course, primary cells such as alkaline $MnO_2$ cells can also be employed. When using fuel cells, such as zinc/air cells, housing 10 will be provided with openings to permit air to enter and make contact with the cells whereby to establish an electrical potential.

A variety of shapes of batteries also can be employed. While FIGS. 3 and 4 depict cylindrically shaped cells 30 that are suitably used for computer applications, relatively thin, rectangular cells (generally referred to as prismatic cells) can also be used. In such case, the extrusion die would be configured to provide a cell housing conforming to the shape and size of an assembly of such thin battery cells.

As shown in FIGS. 2 and 4, to further secure a plurality of cylindrical cells, cell housing 10 suitably contains two or more concave nesting cavities. In the particular embodiment shown, housing 10 has two concave nesting cavities 36 and 38 defined by the housing wall, including arcuate flute 24.

As discussed above, in the particular exemplary embodiment shown in FIG. 1, the ends of housing 10 are enclosed with front and rear caps. Terminal cap 32 will suitably have at least one positive terminal 32a and at least one negative terminal 32b in electrical contact with the individual battery cells of the assembly 28. For a cell assembly containing nickel/metal hydride cells or other secondary cells, the assembly may advantageously also comprise a thermistor or other device to assist charging and/or to enhance safety. In such cases, cap 32 will also have a further set of terminals 40 which are suitably connected for use with an external monitoring, or other device, all as will be familiar to those skilled in the art.

Rear cap 34 may have one or more vent holes 34a as depicted in FIG. 5 for the purpose of enabling any internally developed gas to be vented. Both cap 32 and cap 34 are preferably affixed to housing 10 by ultrasonic sealing, laser welding, or the like. Caps 32 and 34 also can be suitably affixed to housing 10 by an adhesive or physical crimping of the edges of the housing while heating the caps.

When the batteries of the invention incorporate cylindrical nickel/metal hydride cells, it is preferred that the total external thickness of the housing, as measured between the outside surfaces of the flat wall surfaces of the tubular, extruded plastic housing will be less than about 20 millimeters, and most preferably less than about 18.5 mm. With prismatic cells, it is possible and desireable to have that thickness be less than about 7 mm.

An example of a preferred battery having an extremely thin-walled housing and which is highly desirable, being adapted specifically for use in a notebook computer, is set forth below. The construction of this battery includes a cell housing having two opposed, substantially flat sides as depicted in FIGS. 1–2. It is formed of a polycarbonate plastic sold under the tradename LEXAN 950 by General Electric. It has a length of 208 mm., a width of 52 mm. and a height of 18.2 mm. It contains 9 cylindrical nickel/metal hydride cells connected in series. The battery delivers a rechargeable output of 10.8 volts, and has a rated capacity of 2400 mAhs.

Another preferred battery is one which is identical in all respects except the height of each of the nine cells and the overall length of the battery. In this case, the battery uses the same extruded tube, but cut to a shorter length. Accordingly, this battery has a length of 140 mm., and has a rated capacity of 1500 mAhs.

Another example of a highly desirable battery is one which is made in a similar manner to those described above, but which is of a different configuration and contains 6 prismatic nickel/metal hydride cells connected in series. This battery has a length of 100 mm., a width of 50 mm. and a height of only 6.5 mm.

While the particular embodiments of the invention as described above represent preferred embodiments of the invention, modifications thereof may occur to those in the art that are within the spirit and scope of the invention. Hence, the invention is not to be construed as limited to the specific embodiment disclosed, except as defined by the appended claims.

What is claimed is:

1. A battery assembly comprising a tubular, plastic, sleeve-shaped housing having a uniform wall of cross-section thickness less than 0.7 millimeters throughout its length and formed by a process consisting of extrusion; at least one individual self-contained electrochemical cell positioned within the housing; said housing wall closely conforming to the shape and size of and contacting the cell positioned within the housing; and end caps closing the ends of said tubular housing, one of said end caps having terminals for electrical connection to an external device, wherein said at least one cell within the housing provides additional strength to the housing.

2. The assembly of claim 1, wherein the housing is formed from a material selected from the group consisting of polycarbonate, polyvinylchloride, and ABS resin.

3. The assembly of claim 1, wherein the housing includes means for guiding entry of the assembly into an electrical device.

4. The assembly of claim 1, wherein said wall has a uniform thickness of less than about 0.5 millimeter.

5. The assembly of claim 4, wherein the housing is formed from a polycarbonate plastic.

6. The assembly of claim 1, wherein the tubular, extruded plastic housing has a substantially rectangular sleeve shape.

7. The assembly of claim 1, wherein the tubular, extruded plastic housing has two opposed, substantially flat wall surfaces, and the thickness of the wall of the housing is less than about 0.7 millimeters.

8. The assembly of claim 1, wherein the tubular, extruded plastic housing has two opposed, substantially flat wall surfaces, the total external thickness of the housing is less than about 20 millimeters, and the housing contains cylindrical electrochemical cells.

9. The assembly of claim 8, wherein the tubular, extruded plastic housing has a total thickness between the external surfaces of the two opposed, substantially flat walls of the housing of less than about 18.5 millimeters.

10. The assembly of claim 1, wherein the tubular, extruded plastic housing has two opposed, substantially flat wall surfaces, the total external thickness of the housing is less than about 7 millimeters, and the housing contains prismatic electrochemical cells.

* * * * *